United States Patent
Wegmann et al.

(10) Patent No.: US 8,173,731 B2
(45) Date of Patent: May 8, 2012

(54) STABILIZER COMPOSITIONS FOR HALOGEN CONTAINING POLYMERS

(75) Inventors: Alex Wegmann, Allschwil (CH); Pascal Xanthopoulos, Verrières-le-Buisson (FR)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/916,657

(22) Filed: Nov. 1, 2010

(65) Prior Publication Data

US 2011/0112228 A1  May 12, 2011

Related U.S. Application Data

(63) Continuation-in-part of application No. 12/380,179, filed on Feb. 24, 2009, now abandoned, which is a continuation-in-part of application No. 10/578,046, filed as application No. PCT/EP2004/052645 on Oct. 25, 2004, now abandoned.

(30) Foreign Application Priority Data

Nov. 3, 2003 (EP) ................................. 03104049

(51) Int. Cl.
*C08K 5/36* (2006.01)
(52) U.S. Cl. ........ 524/304; 524/303; 524/349; 524/350; 524/567; 524/569
(58) Field of Classification Search .................. 524/303, 524/304, 349, 350, 567, 569
See application file for complete search history.

(56) References Cited

U.S. PATENT DOCUMENTS

| 4,088,629 | A | 5/1978 | Uhrhan et al. |
| 5,166,271 | A * | 11/1992 | Masuko et al. ............... 525/282 |
| 5,772,921 | A | 6/1998 | Gilg et al. |
| 6,537,670 | B1 * | 3/2003 | Sassi ............................ 428/412 |
| 6,585,989 | B2 * | 7/2003 | Herbst et al. .................. 424/404 |
| 6,596,796 | B1 | 7/2003 | Meier et al. |

FOREIGN PATENT DOCUMENTS

| EP | 0849314 A | 6/1998 |
| EP | 1076075 A | 2/2001 |
| GB | 1001344 A | 8/1965 |
| JP | 10-287783 | 10/1998 |
| JP | 11-315179 | 11/1999 |

OTHER PUBLICATIONS

H. Zweifel, Plastics Additives Handbook, 5TH Ed. 2001, pp. 427-483.
Patent Abstracts of Japan Pub. No. 10287783, Pub. Date Oct. 1998.
Partial translation of JP 11-315179, Nov. 16, 1999.
Partial translation of JP 10-287783, Oct. 27, 1998.

* cited by examiner

*Primary Examiner* — Peter Szekely
(74) *Attorney, Agent, or Firm* — Tyler A. Stevenson

(57) ABSTRACT

The instant invention relates to a composition and process for the stabilization of halogen containing polymer slurries, in particular polyvinylchloride (PVC). The composition comprises a halogen containing polymer in the form of an aqueous suspension or emulsion, a partially hindered phenolic antioxidant and selected sulfur containing antioxidants, which are both solid at 20° C. A further aspect of the invention is the use of specific antioxidant mixtures for the stabilization of halogen containing polymer suspensions or emulsions, in particular PVC.

8 Claims, No Drawings

STABILIZER COMPOSITIONS FOR HALOGEN CONTAINING POLYMERS

This application is a continuation in part of U.S. application Ser. No. 12/380,179, filed Feb. 24, 2009, abandoned, which is a continuation in part of U.S. application Ser. No. 10/578,046, abandoned, which is a national stage application of PCT/EP 2004/052645, filed Oct. 25, 2004, the contents of which applications are incorporated by reference.

The instant invention relates to a composition and process for the stabilization of halogen containing polymer slurries, in particular polyvinylchloride (PVC). The composition comprises a halogen containing polymer in the form of an aqueous suspension or emulsion, a partially hindered phenolic antioxidant and selected sulfur containing antioxidants, which are both solid at 20° C. A further aspect of the invention is the use of specific antioxidant mixtures for the stabilization of halogen containing polymer suspensions or emulsions, in particular PVC.

The thermal stability of halogen containing polymers, such as PVC, is relatively low compared to many other polymers. Because of its otherwise good overall properties, its versatility, and cost effectiveness, it is nevertheless an extremely favorable material. However, it can only be used, if it is well stabilized against degradation induced by heat, light, mechanical stress, etc. Protection against thermal degradation is especially important.

Protection of PVC compounds and end articles against thermal degradation can be achieved by so-called "heat stabilizers" which are mostly based on metal salts of organic molecules (e.g. metal soaps), as extensively described in the literature (for example H. Zweifel, Handbook of Plastic Additives, 5$^{th}$ edition, Hanser, 2001, pages 427-483).

However, these heat stabilizers can only be added at the compounding stage. This means, that the halogen containing polymer resin after polymerization remains unprotected during the monomer stripping and drying process. Damages occurring at this stage lower the thermal stability of the resin and of the corresponding compounds and end articles.

To improve the heat stability during the compounding stage EP 0 849 314 suggests adding in addition to a Zn carboxylate a phenolic antioxidant and a thiodipropionic acid ester.

The additional use of phenolic antioxidants and thiodipropionic acid esters with conventional PVC stabilizers during the compounding stage, is also described in GB 1 001 344.

In the case of PVC sterically fully or partially hindered phenolic antioxidants may already be added to the reaction mixture. Sometimes small amounts of fully hindered phenolic antioxidants are added at the beginning of the polymerization and often fully or partially hindered phenolic antioxidants are added towards the end of the polymerization. The thermal stability of the PVC resin, and also of the resulting PVC compound is thereby improved, however, not to a completely satisfactory level.

It has now been found that combinations of partially hindered phenolic antioxidants with thioethers or thioether-esters, added to the halogen containing polymer reaction mixture, which is in the form of an aqueous suspension or emulsion, preferably towards the end of the reaction, greatly improve the thermal stability of the halogen containing polymer and the resulting polymer compound, compared to the current state of the art.

Additional stabilizers may then be added also during the compounding stage.

For example the halogen containing polymer obtained, in particular the virgin PVC resin, undergoes much less dehydrochlorination (loss of chlorine from the PVC) and discoloration upon thermal treatment than conventionally stabilized PVC.

One aspect of the invention is a composition comprising a) a halogen containing polymer or copolymer in the form of an aqueous suspension or emulsion;

b) a sterically hindered phenolic antioxidant with a melting point of more than 20° C. containing a compound of formula (Ia) or (Ib)

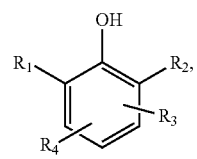

(Ia)

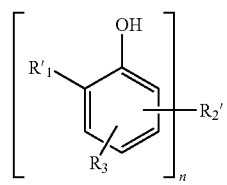

(Ib)

wherein n is 2 or 3

$R_1$ is tert.-butyl, secondary bound $C_3$-$C_{18}$alkyl or $C_5$-$C_6$cycloalkyl;

$R'_1$, is tert. butyl, primary or secondary bound $C_1$-$C_{18}$alkyl, phenyl, $C_7$-$C_9$-phenylalkyl or $C_5$-$C_6$cycloalkyl;

$R_3$ is $C_1$-$C_{18}$ alkyl, $C_1$-$C_{18}$alkoxy, $C_5$-$C_6$cycloalkyl or —$CH_2$—$CH_2$—CO—O—($C_1$-$C_{18}$)alkyl;

$R'_2$ is a divalent or trivalent bridging group;

$R_4$ is a group

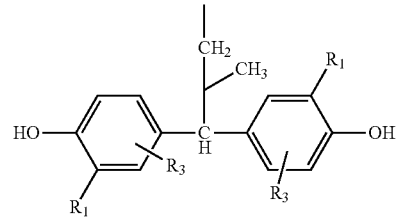

or hydrogen;

$R_2$ is hydrogen, methyl or a group

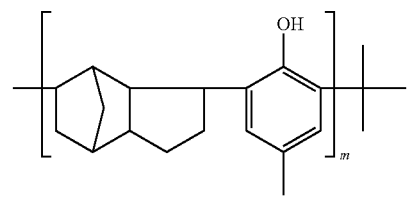

wherein m is a number from 1 to 10; and c) a thioether or thioether-ester with a melting point of more than 20° C. of formula (IIa), (IIb) or (IIc)

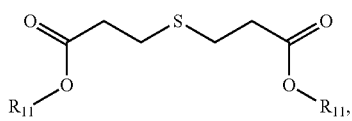
(IIa)

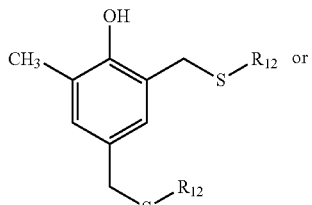
(IIb)

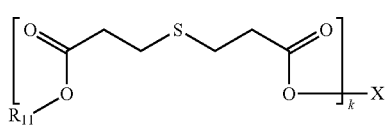
(IIc)

wherein
$R_{11}$ and $R_{12}$ are independently $C_1$-$C_{18}$alkyl
k is 2-4; and
X is 2-methyl-1,2,3-propane-triyl- or 1,2,3,4-methane-tetryl-.

The bridging group $R_2'$ is for example in 2 or 4 position relative to the OH group, preferably in 2 position.

The amount of polymer, in particular PVC, in the suspension or emulsion is typically 30-80%, for instance 40-70% by weight, based on the aqueous phase.

Halogen-containing, in particular chlorine-containing, polymeric materials (component (a)) can be for example: polymers of vinyl chloride, vinyl resins containing vinyl chloride units in their structure, such as copolymers of vinyl chloride and vinyl esters of aliphatic acids, preferably vinyl acetate, copolymers of vinyl chloride with esters of the acrylic and methacrylic acid and with acrylonitrile, copolymers of vinyl chloride with diene compounds and unsaturated dicarboxylic acids or their anhydrides, such as copolymers of vinyl chloride with diethylmaleate, diethylfumarate or maleic acid anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and similar compounds; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and of alpha-substituted acrylic acid; polymers of chlorinated styrolenes, typically dichlorostyrene; chlorinated rubbers; chlorinated polymers of ethylene; polymers and postchlorinated polymers of chlorobutadiene and their copolymers with vinyl chloride; as well as mixtures of the cited polymers with themselves or with other polymerisable compounds.

Other examples are graft polymers of PVC with EVA, ABS and MBS. Preferred substrates are also mixtures of the above-mentioned homo- and copolymers, preferably vinyl chloride homopolymers, with other thermoplastic or/and elastomeric polymers, preferably blends with ABS, MBS, NBR, SAN, EVA, CPE, MBAS, PMA, PMMA, EPDM and polyactones.

Chlorine-containing polymers are particularly preferably polyvinyl chloride as suspension polymers or emulsion polymers.

In a specific embodiment of the invention the sterically hindered phenolic antioxidant containing a structural element of formula (Ia) or (Ib) is of formulae (IIIa), (IIIb) or (IIIc)

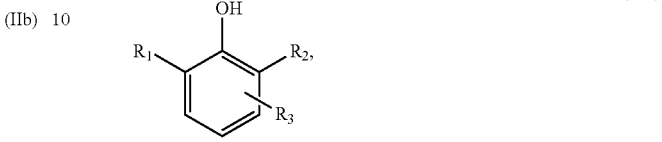
(IIIa)

(IIIb)

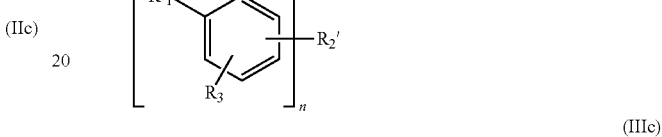
(IIIc)

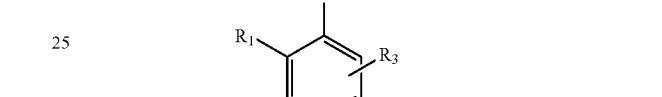

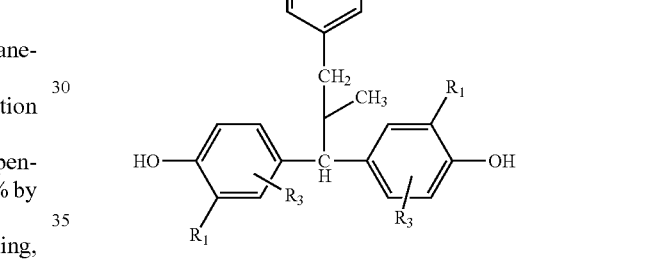

wherein
n is 2 or 3
$R_1$ is tert.-butyl, secondary bound $C_3$-$C_{18}$alkyl or $C_5$-$C_6$cycloalkyl;
$R'_1$ is tert. butyl, primary or secondary bound $C_1$-$C_{18}$alkyl, phenyl, $C_7$-$C_9$phenylalkyl or $C_5$-$C_6$cycloalkyl;
$R_3$ is $C_1$-$C_{18}$ alkyl, $C_1$-$C_{18}$alkoxy, $C_5$-$C_6$cycloalkyl or a group —$CH_2$—$CH_2$—CO—O—($C_1$-$C_{18}$)alkyl;
$R'_2$ is $C_1$-$C_{12}$alkylene, —S—, trimethylene-isocyanurate, or a group —$CH_2$—$CH_2$—CO—($OCH_2CH_2)_p$—O—CO—$CH_2CH_2$— wherein p is a number from 1 to 3;
$R_2$ is hydrogen, methyl or a group

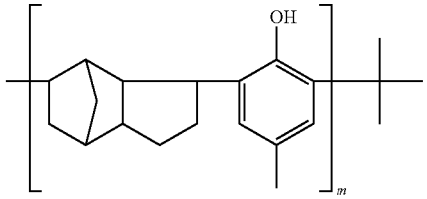

wherein m is a number from 1 to 10.

Alkyl radicals and alkylene radicals, such as those occurring in the general substituent definitions, can be unbranched or branched. Typical examples are methyl, ethyl, propyl, isopropyl, butyl, isobutyl, tert-butyl, pentyl, hexyl, heptyl, octyl, isooctyl, 2-ethylhexyl, nonyl, decyl, undecyl, dodecyl, tridecyl, hexadecyl, octadecyl, eicosyl and heneicosyl. Typical examples of alkylene groups are ethylene, propylene, 2-methylpropylene, 2,2-dimethylpropylene, 2-methyl-2-n-propylpropylene and 2-ethyl-2-n-butyl-propylene.

$C_1$-$C_{18}$alkoxy is for example methoxy, ethoxy, propoxy, dodecyloxy and octadecyloxy. The alkoxy residues may contain straight chain alkyl or branched alkyl groups.

For example in component c) both $R_{11}$ are $C_{12}$alkyl or $C_{18}$alkyl and the $R_{12}$ are $C_{12}$alkyl.

The sterically hindered phenolic antioxidant must have a melting point of above 20° C. in order to be a solid at room temperature. Preferably the melting point is above 25° C. and in particular above 30° C. Equally the thioether or thioether-ester has a melting point of more than 20° C. in order to be a solid at room temperature. Preferably the melting point is above 25° C. and in particular above 30° C.

Particularly preferred sterically hindered phenolic antioxidants are:
2-tert-butyl-4,6-dimethylphenol;
2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, 2,4-dimethyl-6-(1'-methyltetradec-1'-yl)phenol and mixtures thereof;
2,2'-methylenebis(6-tert-butyl-4-methylphenol), 2,2'-methylenebis(6-tert-butyl-4-ethylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol); or
(ethylenebis(oxyethylene)bis[3-(5-tert-butyl-4-hydroxy-m-tolyl)propionate].

Specific compositions are for instance wherein in component b) the sterically hindered phenolic antioxidant is 2-tert-butyl-4,6-dimethylphenol, 2,4-dimethyl-6-(1'-methyltetradec-1'-yl)phenol or a mixture thereof and component c) is di-lauryl-thio-di-propionate, di-stearyl-thio-di-propionate or a mixture thereof.

Most preferred is a composition wherein in component b) the sterically hindered phenolic antioxidant is
2,4-dimethyl-6-(1'-methyltetradec-1'-yl)phenol
and component c) is
di-lauryl-thio-di-propionate.

The compounds of formulae Ia, Ib, IIa, IIb, IIc, IIIa, IIIb and IIIc are known and largely items of commerce.

Typically the sterically hindered phenolic antioxidant, component b) is present in an amount from 50 ppm to 2000 ppm, preferably from 100 ppm to 1000 ppm, based on the weight of the halogen containing monomer.

Component c) is, for example, present in an amount from 50 ppm to 2000 ppm, preferably from 100 ppm to 1000 ppm, based on the weight of the halogen containing monomer.

The ratio of component b) to component c) is, for instance, from 1:10 to 10:1.

In a specific embodiment of the invention the composition contains additionally a sterically hindered phenolic antioxidant different from that of component b), a phosphorous containing stabilizer, a 2-benzofuranone stabilizer, a sterically hindered amine light stabilizer or a UV-absorber.

Further additives, such as fillers, pigments, optical brighteners etc. may also be present. Examples of stabilizers and further additives are given below.
1. Antioxidants
1.1. Alkylated monophenols, for example 2,6-di-tert-butyl-4-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol.
1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.
1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 3,5-di-tert-butyl-4-hydroxyanisole, 3,5-di-tert-butyl-4-hydroxyphenyl stearate, bis(3,5-di-tert-butyl-4-hydroxyphenyl)adipate.
1.4. Tocopherols, for example α-tocopherol, β-tocopherol, γ-tocopherol, δ-tocopherol and mixtures thereof (vitamin E).
1.5. O—, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.
1.6. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
1.7. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
1.8. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine.
1.9. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.
1.10. Acylaminophenols, for example 4-hydroxylauranilide, 4-hydroxystearanilide, octyl N-(3,5-di-tert-butyl-4-hydroxyphenyl)carbamate.
1.11. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.12. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.13. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Amides of β-(3,5-di-tert-butyl-4-hydroxyphenyl)propionic acid e.g. N,N'-bis(3,5-di-tert-butyl-4-hydroxyphenyl-propionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.15. Ascorbic Acid (Vitamin C)

1.16. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV Absorbers and Light Stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyl-oxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—$CH_2CH_2$—COO—$CH_2CH_2$—$]_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-iso-octyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos®168, Ciba-Geigy), tris(nonylphenyl) phosphite,

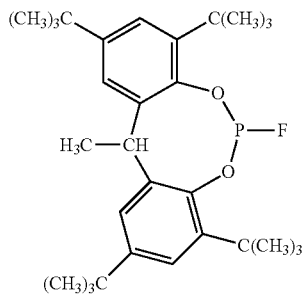
(A)

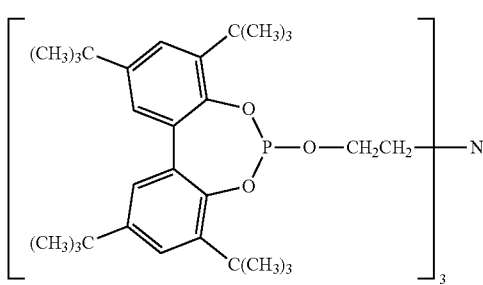
(B)

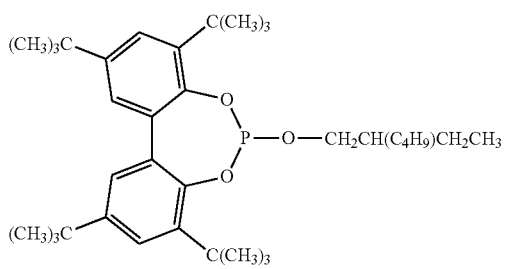
(C)

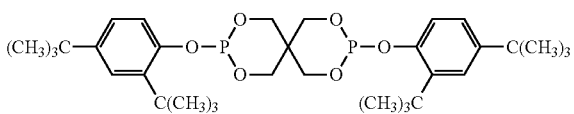
(D)

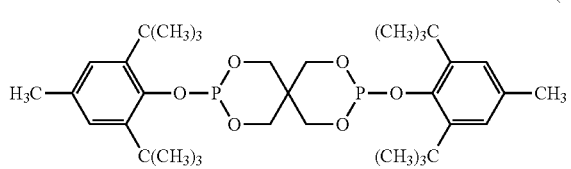
(E)

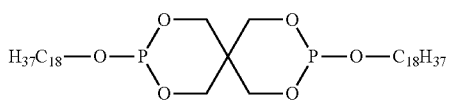
(F)

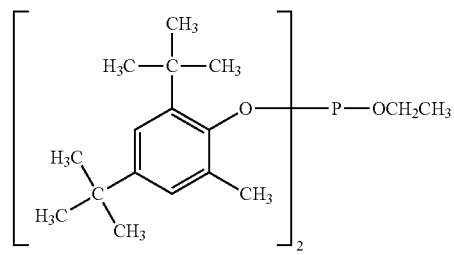
(G)

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydrox-ylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-hepta-decylnitrone, N-octadecyl-alpha-hexadecylnitrone, nitrone derived from N,N-dialkylhydroxyl-amine derived from hydrogenated tallow amine.

7. Peroxide scavengers, for example esters of β-thiodipropionic acid, for example the lauryl, stearyl, myristyl or tridecyl esters, mercaptobenzimidazole or dioctadecyl disulfide, pentaerythritol tetrakis(β-dodecylmercapto) propionate.

8. Polyamide stabilisers, for example copper salts in combination with iodides and/or phos-phorus compounds and salts of divalent manganese.

9. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, magnesium behenate, magnesium stearate, sodium ricinoleate and potassium palmitate or antimony pyrocatecholate.

10. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

11. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

12. Other additives, for example plasticisers, lubricants, emulsifiers, pigments, rheology additives, catalysts, flow-control agents, optical brighteners, flameproofing agents, antistatic agents and blowing agents.

13. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The additives are conveniently added in an amount from 0.01 parts to 10 parts, preferably from 0.05 parts to 5 parts and in particular from 0.1 to 3 parts based on 100 parts of the halogen containing polymer. With the exception of the antioxidants described under item 1, these additives are typically added during the compounding stage of the halogen containing polymer.

In a preferred embodiment of the invention a conventional antioxidant, such as for example mentioned above under item 1, is additionally present in the composition.

Yet further additives, which can optionally be added are for example classical PVC stabilizers, lubricants, pigments, fillers and plasticers.

Zinc compounds are not included in the compositions and processes of this invention.

Zinc compounds for example contain a Zn—O-bond, and are typically zinc enolates, zinc phenolates or/and zinc carboxylates. These latter are compounds from the series of the aliphatic saturated and unsaturated $C_{1-22}$-carboxylates, of the aliphatic saturated or unsaturated $C_{2-22}$-carboxylates, which are substituted by at least one OH group or/and whose chain is interrupted by at least one or more than one O atom (oxa acids), of the cyclic and bicyclic carboxylates containing 5-22 carbon atoms, of the phenylcarboxylates which are unsubstituted or substituted by at least one OH group and/or by $C_{1-16}$alkyl, of the phenyl-$C_{1-16}$alkylcarboxylates, or of the unsubstituted or $C_{1-12}$alkyl-substituted phenolates, or of abietic acid. Zn—S compounds are typically zinc mercaptides, zinc mercaptocarboxylates and zinc mercaptocarboxylates.

Examples to be mentioned the zinc salts of the monovalent carboxylic acids, such as acetic acid, propionic acid, butyric acid, valeric acid, hexanoic acid, oenanthic acid, octanoic acid, neodecanic acid, 2-ethylhexanoic acid, pelargonic acid, decanoic acid, undecanoic acid, dodecanoic acid, tridecanoic acid, myristylic acid, palmitic acid, lauric acid, isostearic acid, stearic acid, 12-hydroxystearic acid, 9,10-dihydroxystearic acid, oleic acid, ricinolic acid, 3,6-dioxaheptanoic acid, 3,6,9-trioxadecanoic acid, behenic acid, benzoic acid, p-tert-butylbenzoic-acid, dimethylhydroxybenzoic acid, 3,5-di-tert-butyl-4-hydroxybenzoic acid, tolylic acid, dimethylbenzoic acid, ethylbenzoic acid, n-proylbenzoic acid, salicylic acid, p-tert-octylsalicylic acid, and sorbic acid, cinnamic acid, mandelic acid, glycolic acid; zinc salts of the divalent carboxylic acids or of the monoesters, typically oxalic acid, malonic acid, succinic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, lactic acid, malonic acid, maleic acid, tartaric acid, malic acid, salicylic acid, polyglycol dicarboxylic acid (n=10-12), phthalic acid, isophthalic acid, terephthalic acid and hydroxyphthalic acid; and of the di- or triesters of the tri- or tetravalent carboxylic acids, typically hemimellitic acid, trimellitic acid, pyromellitic acid, citric acid and also so-called overbased zinc carboxylates or zinc laurylmercaptide, zinc thioglycolate, zinc thiosalicylate, zinc-bis-i-octylthioglycolate, zinc mercaptopropionate, zinc thiolactate, zinc thiomalate, zinc-bis-octylmercaptopropionate, zinc-bis-isooctylthiolactate and zinc-bis-laurylthiomalate.

The zinc enolates are enolates of acetylacetone, benzoylacetone, dibenzoylmethane as well as enolates of acetoacetic acid and benzoyl acetate and also dehydracetic acid. It is also possible to use inorganic zinc compounds, such as zinc oxide, zinc hydroxide, zinc carbonate, basic zinc carbonate or zinc sulfide.

Zinc carboxylates are of a carboxylic acid having 1 to 22 carbon atoms (zinc soaps), typically benzoates or alkanoates, $C_8$alkanoates, stearate, oleate, laurate, palmitate, behenate, versatate, hydroxystearates and hydroxyoleates, ricinoleate, dihydroxystearates, p-tert-butylbenzoate, or (iso)octanoate. Stearate, oleate, versatate, benzoate, p-tert-butylbenzoate and 2-ethylhexanoate are specific examples.

Further additives which can optionally be added are stabilizers, lubricants, pigments, fillers and plasticizers. Examples are below.

b) Polyols

Suitable compounds of this type are for example:
pentaerythritol, dipentaerythritol, tripentaerythritol, bistrimethylolpropane, trimethylolethane, bistrimethylolethane, trimethylolpropane, bis-trimethylolpropane, sorbitol, maltite, isomaltite, lactite, lycasine, mannitol, xylite, inosite, lactose, leucrose, tris(hydroxyethyl)isocyanurate, palatinite, tetramethylolcyclohexanol (TMCH), tetramethylolcyclopentanol, tetramethylol-cyclopyranol, glycerol, diglycerol, polyglycerol, thiodiglycerol, or 1-0-α-D-glycopyranosyl-D-mannitol dihydrate as well as polyvinyl alcohol and cyclodextrins; and also condensates of such polyols, typically dipentaerythritol adipate, glycerol oleate, glycerol trioleate, and the like. TMCH, pentaerythritol, dipentaerythritol, sorbitol and the disaccharide alcohols are preferred. The polyols can be used in an amount of e.g. 0.01 to 20, conveniently of 0.1 to 20 and, preferably, of 0.1 to 10, parts by weight, based on 100 parts by weight of component (i).

c) 1,3-Dicarbonyl Compounds

Illustrative examples of 1,3-dicarbonyl compounds are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoyl-benzoylmethane, stearoylbenzoylmethane, isooctylbenzoylmethane, 5-hydroxycapronyl-benzoylmethane, tribenzoylmethane, bis(4-methylbenzoyl)methane, benzoyl-p-chlorobenzoyl-methane, bis(2-hydroxybenzoyl)methane, 4-methoxybenzoylbenzoylmethane, bis(4-methoxy-benzoyl)methane, 1-benzoyl-1-acetylnonane, benzoylacetylphenylmethane, stearoyl-4-methoxy-benzoylmethane, bis(4-tert-butylbenzoyl)methane, benzoyl-formylmethane, benzoylphenylacetylmethane, bis(cyclohexanoyl)methane, di(pivaloyl)methane, methyl acetoacetate, ethyl acetoacetate, hexyl acetoacetate, octyl acetoacetate, dodecyl acetoacetate or octadecyl acetoacetate, ethyl benzoylacetate, butyl benzoylacetate, 2-ethylhexyl benzoylacetate, dodecyl benzoylacetate or octadecyl benzoylacetate, ethyl stearoylacetate, propyl stearoylacetate, butyl stearoylacetate, hexyl stearoylacetate or octyl stearoylacetate and dehydracetoactic acid as well as the alkali metal, alkaline earth metal or aluminium salts thereof. The 1,3-dicarbonyl compounds can be used in an amount of e.g. 0.01 to 10, conveniently of 0.01 to 3 and, preferably, of 0.01 to 2, parts by weight, based on 100 parts by weight of PVC.

d) Epoxides and Epoxidised Fatty Acid Esters

In this connection, epoxidised esters of fatty acids from natural sources, such as soy bean oil or rape seed oil, are to be mentioned in particular.

The epoxy compounds are preferably used in amounts of e.g. 0.1 part by weight, based on 100 parts by weight of composition, conveniently of 0.1 to 30, preferably of 0.5 to 25 parts by weight, based on 100 parts by weight of component (i). Other examples are epoxidised polybutadiene, epoxidised linseed oil, epoxidised fish oil, epoxidised tallow, methylbutyl- or 2-ethylhexylepoxystearate, tris(epoxypropyl)isocyanurate, epoxidised castor oil, epoxidised sunflower oil, 3-phenoxy-1,2-epoxypropane, diglycidyl ether of bisphenol A, vinylcyclohexene di-epoxide, dicyclopentadiene diepoxide and 3,4-epoxycyclohexylmethyl-3,4-epoxycyclohexan-ecarboxylate.

Suitable epoxides are also derivatives of bisphenol A and bisphenol F, as described, inter alia, in U.S. Pat. Nos. 5,492,949, 5,519,077 and 5,543,449.

e) Dihydropyridines and Polydihydropyridines

Suitable monomeric dihydropyridines are the compounds described, inter alia, in FR-A-2039496, EP-A-2007, EP-A-362012, EP-A-24754 and EP-A-716123. Preferred compounds are those of formula

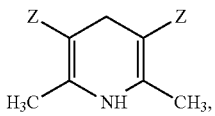

wherein Z is $CO_2CH_3$, $CO_2C_2H_5$, $CO_2$-n-$C_{12}H_{25}$ or —$CO_2C_2H_4$—S-n-$C_{12}H_{25}$.

Polydihydropyridines are preferably compounds of the following formula

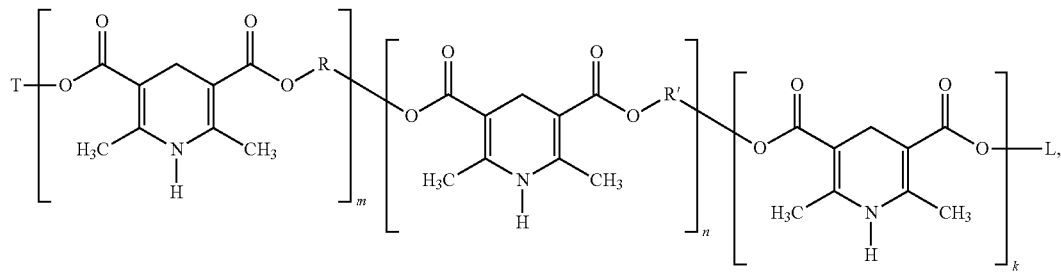

wherein T is unsubstituted $C_{1-12}$alkyl.
L has the same meaning as T.
m and n are numbers from 0 to 20,
k is 0 or 1,
R and R' are each independently of the other ethylene, propylene, butylene or an alkylene- or cycloalkylenebismethylene group of the —$(-C_pH_{2p}-X-)_tC_pH_{2p}$ type.
p is 2 to 8,
t is 0 to 10,
X is oxygen or sulfur.

Such compounds are described in more detail in EP-A-286887. The (poly-)dihydropyridines can be used in the halogen-containing polymer conveniently in an amount of 0.001 to 5 and, preferably, of 0.005 to 1, parts by weight, based on 100 parts of the polymer.

Thiodiethylene-bis[5-methoxycarbonyl-2,6-dimethyl-1,4-dihydropyridine-3-carboxylate] and 1,4-dihydro-2,6-dimethyl-3,5-dicarbododecyloxypyridine are particularly preferred.

f) Perchlorates

Typical examples are those of formula $M(ClO_4)_n$ wherein M is Li, Na, K, Mg, Ca, Ba, Zn, Al, Ce or La. Depending on the valency of M, the index n is 1, 2 or 3. The perchlorates can be complexed with alcohols or ether alcohols. Each perchlorate can be used in different standard forms of presentation; e.g. as salt or aqueous solution of the salts or of the free acid applied to a substrate such as PVC, calcium silicate, zeolites or hydrotalcites, or can be obtained by chemical reaction of hydrotalcite with perchloric acid.

The perchlorates can be used in an amount of e.g. 0.001 to 5, conveniently of 0.01 to 3, particularly preferably of 0.01 to 2, parts by weight, based on 100 parts by weight of component (i).

g) Hydrotalcites and Zeolites

The chemical composition of these compounds is known to the skilled person, e.g. from DE-A-3843581, U.S. Pat. No. 4,000,100, EP-A-062813, WO-A-93/20135.

Compounds of the hydrotalcite series can be described by the general formula III $$M^{2+}_{1-x}.M^{3+}_x.(OH)_2.(A^{n-})_{x/n}.mH_2O \qquad (III),$$

wherein
$M^{2+}$=one or more of the metals selected from the group consisting of Mg, Ca, Sr, Zn and Sn,
$M^{3+}$=Al or B,
$A^n$ is an anion of valency n,
n is a number from 1 to 2,
$0<x\leq 0.5$,
m is a number from 0 to 20.
$A^n$=$OH^-$, $ClO_4^-$, $HCO_3^-$, $CH_3COO^-$, $C_6H_5COO^-$, $CO_3^{2-}$, $SO_4^{--}$,

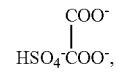

$(CHOHCOO)_2^{2-}$, $(CH_2COO)_2^{2-}$, $CH_3CHOHCOO^-$, $HPO_3^{2-}$ or $HPO_4^{2-}$ is preferred.

It is also possible to use hydrotalcites comprising LiOH or $Li_2CO_3$ ("solid solution").

Examples of hydrotalcites are
$Al_2O_3.6MgO.CO_2.12H_2O$, $Mg_{4.5}Al_2(OH)_{13}CO_3.3.5H_2O$, $4MgO.Al_2O_3.CO_2.9H_2O$, $4MgO.Al_2O_3.CO_2.6H_2O$, $ZnO.3MgO.Al_2O_3.CO_2.8-9H_2O$ and $ZnO.3MgO.Al_2O_3.CO_2.5-6H_2O$. Compounds of the zeolite series (alkali metal alumosilicates or alkaline earth metal alumosilicates) can be described by the general formula (IV)

$$M_{x/n}[(AlO_2)_x(SiO_2)_y]\cdot wH_2O \tag{IV}$$

wherein n is the charge of cation M;
M is an element of the first or second main group of the Periodic Table, such as Li, Na, K, Mg, Ca, Sr or Ba, or Zn, y:x is a number from 0.8 to 15, preferably from 0.8 to 1.2; and w is a number from 0 to 300, preferably from 0.5 to 30.

Structures may be found, for example, in "Atlas of Zeolite" by W. M. Meier and D. H. Olson, Butterworth-Heinemann, 3. Ed. 1992.

Examples of zeolites are sodium alumosilicates of formulae
$Na_{12}Al_{12}Si_{12}O_{48}\cdot 27\,H_2O$ [zeolite A], $Na_6Al_6Si_6O_{24}\cdot 2\,NaX\cdot 7.5\,H_2O$, X=OH, halogen, $ClO_4$ [sodalite]; $Na_6Al_6Si_{30}O_{72}\cdot 24\,H_2O$; $Na_8Al_8Si_{40}O_{96}\cdot 24\,H_2O$; $Na_{16}Al_{16}Si_{24}O_{80}\cdot 16\,H_2O$; $Na_{16}Al_{16}Si_{32}O_{96}\cdot 16H_2O$; $Na_{56}Al_{56}Si_{136}O_{384}\cdot 250H_2O$ [zeolite Y], $Na_{86}Al_{86}Si_{106}O_{384}\cdot 264H_2O$ [zeolite X]; as well as X- and Y-zeolite in an Al/Si ratio of 1/1;
or the zeolites which may be represented by the partial or complete exchange of the sodium atoms by Li atoms, K atoms, Mg atoms, Ca atoms, Sr atoms or Zn atoms such as $(Na,K)_{10}Al_{10}Si_{22}O_{64}\cdot 20H_2O$; $Ca_{4.5}Na_3[(AlO_2)_{12}(SiO_2)_{12}]\cdot 30H_2O$; $K_9Na_3[(AlO_2)_{12}(SiO_2)_{12}]\cdot 27H_2O$.

Other suitable zeolites are:
$Na_2O\cdot Al_2O_3\cdot(2\text{ to }5)\,SiO_2\cdot(3.5\text{ to }10)\,H_2O$ [zeolite P]
$Na_2O\cdot Al_2O_3\cdot 2SiO_2\cdot(3.5\text{-}10)H_2O$ (zeolite MAP)
or the zeolites which can be represented by the partial or complete exchange of the Na atoms by Li atoms, K atoms or H atoms, typically
$(Li,Na,K,H)_{10}Al_{10}Si_{22}O_{64}\cdot 20H_2O$, $K_9Na_3[(AlO_2)_{12}(SiO_2)_{12}]\cdot 27H_2O$, $K_4Al_4Si_4O_{16}\cdot 6H_2O$ [zeolite K—F], $Na_8Al_8Si_{40}O_{96}\cdot 24H_2O$ zeolite D, such as described in Barrer et al., J. Chem. Soc. 1952, 1561-71, and in U.S. Pat. No. 2,950,952.

The following zeolites are also suitable:
K offretite, such as described in EP-A-400 961; zeolite R, such as described in GB-A-841 812; zeolite LZ-217, as described in U.S. Pat. No. 4,503,023; calcium-free zeolite LZ-218, as described in U.S. Pat. No. 4,333,859; zeolite T, zeolite LZ-220, as described in U.S. Pat. No. 4,503,023; $Na_3K_6Al_9Si_{27}O_{72}\cdot 21H_2O$ [zeolite L]; zeolite LZ-211, as described in U.S. Pat. No. 4,503,023; zeolite LZ-212, as described in U.S. Pat. No. 4,503,023; zeolite 0, zeolite LZ-217, as described in U.S. Pat. No. 4,503,023; zeolite LZ-219, as described in U.S. Pat. No. 4,503,023; zeolite Rho, zeolite LZ-14, as described in U.S. Pat. No. 4,503,023; zeolite ZK-19, as described in Am. Mineral. 54 1607 (1969); zeolite W (K-M), as described in Barrer et al. J. Chem. Soc. 1956, 2882; $Na_{30}Al_{30}Si_{66}O_{192}\cdot 98H_2O$ [zeolite ZK-5, zeolite Q]; as well as $AlPO_4$ compounds with zeolite structure.

It is preferred to use zeolite P types of formula $M_2O\cdot Al_2O_3\cdot xSiO_2\cdot yH_2O$ (IVa), wherein x is 2 to 5, and y is 3.5 to 10, and M is an alkali metal atom and, very particularly preferably, zeolite MAP of formula IVa, wherein x is 2 and y is 3.5 to 10. Preferred is zeolite Na—P, i.e. M is Na. This zeolite is usually obtained in the variants Na—P-1, NaP-2 and Na—P-3, which differ from each other in their cubical, tetragonal or orthorhombic structure (R. M. Barrer, B. M. Munday, J. Chem. Soc. A 1971, 2909-14). The above-mentioned literature also describes the preparation of zeolite P-1 and P-2. According to this literature, zeolite P-3 is very rare and is therefore hardly of any practical interest. The structure of zeolite P-1 corresponds to the gismondite structure known from the above Atlas of Zeolite Structures. The more recent literature (EP-A-384 070) makes a difference between the cubical (zeolite B or $P_C$) and the tetragonal (zeolite $P_1$) zeolite of the P type. It also mentions newer zeolites of the P type having Si:Al ratio of less than 1.07:1. These zeolites are called MAP or MA-P for "maximum aluminium P". Depending on the method of preparation, zeolite P can contain minor amounts of other zeolites. A very pure zeolite P is described in WO-A-94/26662.

Within the scope of this invention, it is also possible to use those finely particulate water-insoluble sodium alumosilicates which were precipitated and crystallised in the presence of water-soluble inorganic or organic dispersants. These may be added to the reaction mixture in any manner before or during precipitation or crystallisation Sodium zeolite A, sodium zeolite P, sodium zeolite X and sodium zeolite Y are particularly preferred.

The hydrotalcites and zeolites can also be naturally occurring minerals or synthetically obtained compounds.

The hydrotalcites and/or zeolites can be used in amounts of e.g. 0.1 to 50, conveniently of 0.1 to 10 and, preferably, of 0.1 to 5, parts by weight, based on 100 parts by weight of halogen-containing polymer.

h) Alkalialumocarbonates (Dawsonites),
These compounds may be represented by formula

$$\{(M_2O)_m\cdot(Al_2O_3)_n\cdot Z_o\cdot pH_2O\} \tag{V}$$

wherein M is H, Li, Na, K, $Mg_{1/2}$, $Ca_{1/2}$, $Sr_{1/2}$ or $Zn_{1/2}$; Z is $CO_2$, $SO_2$, $(Cl_2O_7)_{1/2}$, $B_4O_6$, $S_2O_2$ (thiosulfate) or $C_2O_2$ (oxalate); m, if M=$Mg_{1/2}$ or $Ca_{1/2}$, is a number from 1 to 2, and in all other cases a number from 1 to 3; n is a number from 1 and 4; o is a number from 2 to 4; and p is a number from 0 to 30.

The alumo salt compounds of formula (V) which may be used can be naturally occurring minerals or synthetically prepared compounds. The metals can be partially exchanged for each other. The cited alumo salt compounds are crystalline, partially crystalline or amorphous or can be in the form of a dried gel. The alumo salt compounds can also be obtained in rarer crystalline modifications. EP 394670 describes a method for the preparation of such compounds. Typical examples of naturally occurring alumo salt compounds are indigirite, tunisite, alumohydrocalcite, para-alumohydrocalcite, strontiodresserite and hydrostrontiodresserite. Other examples of alumo salt compounds are:
potassium alumocarbonate $\{(K_2O)\cdot(Al_2O_3)\cdot(CO_2)_2\cdot 2H_2O\}$,
sodium alumothiosulfate $\{(Na_2O)\cdot(Al_2O_3)\cdot(S_2O_2)_2\cdot 2H_2O\}$,
potassium alumosulfite $\{(K_2O)\cdot(Al_2O_3)\cdot(SO_2)_2\cdot 2H_2O\}$,
calcium alumooxalate $\{(CaO)\cdot(Al_2O_3)\cdot(C_2O_2)_2\cdot 5H_2O\}$,
magnesium alumotetraborate $\{(MgO)\cdot(Al_2O_3)\cdot(B_4O_6)_2\cdot 5H_2O\}$,
$\{([Mg_{0.2}Na_{0.6}]_2O)\cdot(Al_2O_3)\cdot(CO_2)_2\cdot 4.1H_2O\}$,
$\{([Mg_{0.2}Na_{0.6}]_2O)\cdot(Al_2O_3)\cdot(CO_2)_2\cdot 4.3H_2O\}$ and
$\{([Mg_{0.3}Na_{0.4}]_2O)\cdot(Al_2O_3)\cdot(CO_2)_{2.2}\cdot 4.9H_2O\}$.

The mixed alumosalt compounds can be obtained by methods known per se by cation exchange, preferably from the alkali metal alumo salt compounds or by combination precipitation (see, for example, U.S. Pat. No. 5,055,284).

Preferred alumo salt compounds are those of the above formula, wherein M is Na or K; Z is $CO_2$, $SO_2$ or $(Cl_2O_7)_{1/2}$; m is 1-3; n 1-4; o is 2-4, and p is 0-20. Z is particularly preferably $CO_2$. Other preferred compounds are those which can be represented by the following formulae:
$M_2O\cdot Al_2O_3\cdot(CO_2)_2\cdot pH_2O$ (Ia), $(M_2O)_2\cdot(Al_2O_3)_2\cdot(CO_2)_2\cdot pH_2O$ (Ib), $M_2O\cdot(Al_2O_3)_2\cdot(CO_2)_2\cdot pH_2O$ (Ic),
where M is a metal, such as Na, K, $Mg_{1/2}$, $Ca_{1/2}$, $Sr_{1/2}$ or $Zn_{1/2}$, and p is a number from 0 to 12.

Sodium alumodihydroxycarbonate (DASC) and the homologous potassium compound (DAPC) are particularly preferred.

Instead of the dawsonites, it is also possible to use silicates having cation exchanger properties, such as bentonites, magadiite, haremite, and the like.

The dawsonites can be used in an amount of e.g. 0.01 to 50, conveniently of 0.1 to 10, particularly preferably of 0.1 to 5, parts by weight, based on 100 parts by weight of halogen-containing polymer.

i) Plasticisers

Suitable organic plasticiser are, for example, those of the following groups:

A) Phthalates:

Typical examples of such plasticisers are dimethyl phthalate, diethyl phthalate, dibutyl phthalate, dihexyl phthalate, di-2-ethylhexyl phthalate, di-n-octyl phthalate, di-iso-octyl phthalate, di-iso-nonyl phthalate, di-iso-decyl phthalate, di-iso-tridecyl phthalate, dicyclohexyl phthalate, di-methylcyclohexyl phthalate, dimethyl glycol phthalate, dibutyl glycol phthalate, benzylbutyl phthalate and diphenyl phthalate as well as mixtures of phthalates, such as $C_{7-9}$- and $C_{9-11}$alkylphthalates of predominantly linear alcohols, $C_{6-10}$-n-alkylphthalates and $C_{8-10}$-n-alkylphthalates. Of these are preferred dibutyl phthalate, dihexyl phthalate, di-2-ethylhexyl phthalate, di-n-octyl phthalate, di-iso-octyl phthalate, di-iso-nonyl phthalate, di-iso-decyl phthalate, di-iso-tridecyl phthalate and benzylbutyl phthalate as well as the cited mixtures of alkyl phthalates. Particularly preferred are di-2-ethylhexyl phthalate, di-iso-nonyl phthalate and di-iso-decyl phthalate, which are also known by their standard abbreviations DOP (dioctyl-phthalate, di-2-ethylhexyl phthalate), DINP (di-isononyl phthalate), DIDP (diisodecyl phthalate).

B) Esters of Aliphatic Dicarboxylic Acids, in Particular Esters of Adipic Acid, Azelaic Acid and Sebaccic Acid Typical examples of such plasticisers are di-2-ethylhexyladipate, di-isooctyladipate (mixture), di-isononyl adipate (mixture), di-isodecyl adipate (mixture), benzyl butyl adipate, benzyl octyl-adipate, di-2-ethylhexyl azelate, di-2-ethylhexyl sebacate and di-isodecyl sebacate (mixture). Di-2-ethylhexyl adipate and di-isooctyl adipate are preferred.

C) Trimellitates, typically tri-2-ethylhexyl trimellitate, tri-isodecyltrimellitate (mixture), tri-isotridecyl trimellitate, tri-isooctyltrimellitate (mixture) as well as tri-$C_{6-8}$alkyl trimellitate, tri-$C_{6-10}$alkyl trimellitate, tri-$C_{7-9}$alkyl trimellitate and tri-$C_{9-11}$alkyl trimellitate. The last-mentioned trimellitates are obtained by esterifying the trimellitic acid with the corresponding alkanol mixtures. Preferred trimellitates are tri-2-ethylhexyl trimellitate and the cited trimellitates of alkanol mixtures. Standard abbreviations used are TOTM (trioctyl trimellitate, tri-2-ethylhexyl trimellitate), TIDTM (triisodecyl trimellitate) and TITDTM (triisotridecyl trimellitate).

D) Epoxide Plasticisers

These are mainly the epoxidised unsaturated fatty acid, such as epoxidised soy bean oil.

E) Polymeric Plasticisers

The most customary starting materials used for the preparation of the polyester plasticisers are: dicarboxylic acid, such as adipic acid, phthalic acid, azelaic acid and sebaccic acid; diols, such as 1,2-propanediol, 1,3-butanediol, 1,4-butanediol, 1,6-hexanediol, neopentyl glycol and diethylene glycol.

F) Phosphoric Acid Esters

Typical examples of such phosphoric acid esters are tributyl phosphate, tri-2-ethylbutyl phosphate, tri-2-ethylhexyl phosphate, trichlorethyl phosphate, 2-ethylhexyldi-phenyl phosphate, cresyldiphenyl phosphate, triphenyl phosphate, tricresyl phosphate and trixyleneyl phosphate.

Tri-2-ethylhexyl phosphate and ®Reofos 50 and 95 (ex. FMC) are preferred.

G) Chlorinated Hydrocarbons (Paraffins)

H) Hydrocarbons

I) Monoesters, e.g. Butyl Oleate, Phenoxyethyl Oleate, Tetrahydrofurfuryl Oleate and Alkyl Sulfonate.

J) Glycol Esters, e.g. Diglycol Benzoate.

Definitions and examples of plasticisers of groups A) to J) are to be found in the following reference books:

"Taschenbuch der Kunststoffadditive", edited by R. Gächter and H. Müller, Carl Hanser Verlag, 1989, chapter 5 S 341-442.

"PVC Technology", editor W. V. Titow, 4th Ed., Elsevier Publishers, 1984, chapter 6, pages 147-180.

It is also possible to use mixtures of different plasticisers. The plasticisers can be used in an amount of e.g. 5 to 120, conveniently of 10 to 100, parts by weight, based on 100 parts by weight of PVC.

i) Suitable lubricants are for example:

Montan wax, fatty acid ester, PE waxes, amide waxes, chloroparaffin, glycerol ester, solid or liquid paraffin waxes or alkaline earth metal soaps, or lubricants based on silicone, such as described in EP-A-225261. Lubricants which can be used are also described in "Taschenbuch der Kunststoffadditive", edited by R. Gächter and H. Müller, Carl Hanser Verlag, 3rd Ed. 1989, pages 478-488. Prior to being added to the polymeric materials, the lubricants can also be blended with the stabilisers.

k) Fillers

Suitable fillers ("Handbook of PVC-Formulating", by E. J. Wickson, John Wiley & Sons, New York 1993, p. 393-449) and reinforcing agents ("Taschenbuch der Kunststoffadditive", editors R. Gächter and H. Müller, Carl Hanser Verlag, 3rd Ed. 1989, pages 549-615) can be for example: calcium carbonate, dolomite, wollastonite, magnesium oxide, magnesium hydroxide, silicates, glass fibres, talcum, kaolin, chalk, mica, metal oxides and metal hydroxides, carbon black or graphite. Chalk is preferred.

l) Pigments

Suitable materials are known to the skilled person. Typical examples of inorganic pigments are $TiO_2$, carbon black, $Fe_2O_3$, $Sb_2O_3$, $(Ti,Ba,Sb)O_2$, $Cr_2O_3$, spinells, such a cobalt blue and cobalt green, Cd(S,Se), ultramarine blue. $TiO_2$, also in micronised form, is preferred. Organic pigments are, for example, azo pigments, phthalocyanine pigments, quinacridone pigments, perylene pigments, pyrrolopyrrylidone pigments and anthraquinone pigments. Further details are to be found in "Handbook of PVC Formulating", E. J. Wickson, John Wiley & Sons, New York 1993, p. 449-474.

m) Organotin Compounds

The organotin compounds are, for example, organotin oxides, organotin sulfides, organotin carboxylates, organotin mercaptocarboxylates, organotin mercaptides and/or organotin mercaptocarboxylates, such as dibutyltin oxide, dioctyltin maleinate, dibutyltin maleic acid semiester, bis-dibutyltin-2-ethylhexanoate oxide and other SnO compounds, such as described, inter alia, in EP-A-573394.

Suitable organotin mercaptides are, for example, compounds of the general structure $R_nSn(SA)_{4-n}$, wherein R is, inter alia, a methyl, butyl, octyl, lauryl or carbobutoxyethyl group, n is 1 or 2, nd A is typically a decyl, dodecyl or carboalkoxymethyl or carboalkyloxyethyl radical, and the alkoxy moiety is a straight-chain or branched $C_6$-$C_{18}$alkoxy or $C_5$-$C_8$cycloalkoxy radical. Illustrative examples of such tin compounds are dimethyltin bis-carboisooctyloxymethyl mercaptide, dibutyltin dilauryl mercaptide, dioctyltin bis-carbo-2-ethylhexoxymethyl mercaptide, dimethyltin bismercaptoethyl stearate, octyltin tris-carbo-2-ethylhexoxymethyl mercaptide, monomethyltin mercaptoethyl oleate sulfide and bis-dimethyltin mercaptoethyl stearate sulfide.

n) Organic Nitrogen Compounds

Suitable organic nitrogen compounds are, for example, ureas and thioureas, aminobenzene sulfonates, aminobenzoates, aminobenzamides, cyanamides, dicyandiamides, guanidines, guanamines, melamines, indoles, aminocrotonates, tetrazoles, triazoles, substituted amino-triazoles, m-aminophenols, aminouracils, pyrroles, aminopyrroles, and others, such as described, inter alia, in DE-A-746 081, U.S. Pat. No. 2,557,474, DD-A-652, DE-A-871 834, EP-A-174 412, DE-A-1 162 073, U.S. Pat. No. 2,367,483, GB-A-923 319, DE-A-862 512, DE-A-2 524 659, DE-A-1 544 768, DE-A-1 134 197, EP-A-2 756, DE-A-3 048 659, DE-A-3 602 367, EP-A-48 222, EP-A-41 479, EP-A-65 934, EP-A-22 087, EP-A-465 405 and EP-A-390 739.

The above mentioned optional additives can be added to the polymers for example during the compounding stage in known manner, by mixing said compounds and further optional additives with the halogen-containing polymer using known apparatus such as mixers, calenders, kneaders, extruders, mills and the like. In this process they can be added singly or in admixture, or also in the form of so-called masterbatches. The novel polymer compositions can be brought into the desired shape by known methods, such as calendering, extruding, injection moulding, sintering or spinning, and also by extrusion blow moulding or processing by the plastisol process. The polymer compositions can also be processed to foams.

The final polymer compositions are suitable e.g. for semirigid or soft formulations, for example for soft formulations for wire sheaths, cable insulations, floorings, tubes and sealing profiles. In the form of semirigid formulations, said polymer compositions are suitable for decorative films, foams, agricultural sheeting, tubes, sealing profiles, office films, extruded profiles and plates, flooring films and panels, coating materials and artificial leather as well as crash-pad films (for use in automobiles). In the form of rigid formulations, the compositions are suitable for hollow articles (bottles), packaging films, thermoforming films, blown films, crash-pad films (automobiles), pipes, foams, heavy profiles (window frames), light-wall profiles, building profiles, sidings, fittings, and apparatus housings (computers and domestic appliances) as well as other injection moulded articles. Examples of the use of the compositions stabilised according to this invention as plastisols are artificial leather, coating materials, floorings, textile coatings, wall coverings, coil coatings, crash-pad films and automotive underseals.

Examples of sintered applications of the polymer compositions stabilized according to this invention are slush, slush mould and coil coatings.

A further aspect of the invention is a process for the stabilization of halogen containing polymers against thermal degradation, which process comprises adding to the halogen containing polymer during or after the polymerization process b) a sterically hindered phenolic antioxidant with a melting point of more than 20° C. containing a structural element of formula (Ia) or (Ib)

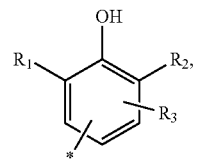

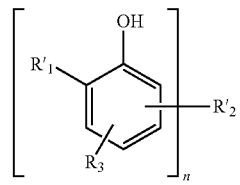

wherein n is 2 or 3

$R_1$ is tert.-butyl, secondary bound $C_3$-$C_{18}$alkyl or $C_5$-$C_6$cycloalkyl;

$R'_1$ is tert. butyl, primary or secondary bound $C_1$-$C_{18}$alkyl, phenyl, $C_7$-$C_9$phenylalkyl or $C_5$-$C_6$cycloalkyl;

$R_3$ is $C_1$-$C_{18}$ alkyl, $C_1$-$C_{18}$alkoxy or $C_5$-$C_6$cycloalkyl;

$R'_2$ is a divalent or trivalent bridging group;

* denotes a direct bond or is hydrogen;

$R_2$ is hydrogen, methyl or a group

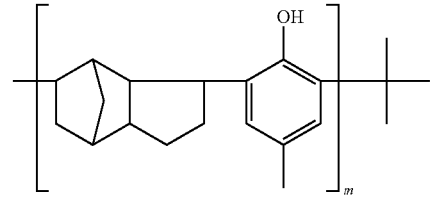

wherein m is a number from 1 to 10; and c) a thioether or thioether-ester with a melting point of more than 20° C. of formula (IIa), (IIb) or (IIc)

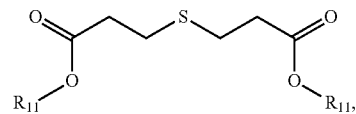

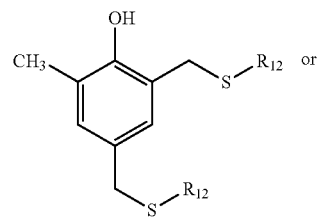

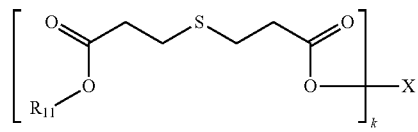

wherein
R$_{11}$ and R$_{12}$ are independently C$_1$-C$_{18}$alkyl
k is 2-4; and
X is 2-methyl-1,2,3-propane-triyl- or 1,2,3,4-methane-tetryl-.

In a specific embodiment the process for the stabilization of halogen containing polymers against thermal degradation comprises
adding to the halogen containing polymer, which is in an aqueous suspension or emulsion during or after the polymerization process
b) a sterically hindered phenolic antioxidant with a melting point of more than 20° C. containing a compound of formula (Ia) or (Ib)

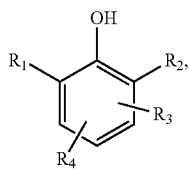
(Ia)

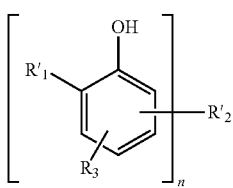
(Ib)

wherein
n is 2 or 3
R'$_1$ is tert.-butyl, secondary bound C$_3$-C$_{18}$alkyl or C$_5$-C$_6$cycloalkyl;
R'$_1$ is tert. butyl, primary or secondary bound C$_1$-C$_{18}$alkyl, phenyl, C$_7$-C$_9$-phenylalkyl or C$_5$-C$_6$cycloalkyl;
R$_3$ is C$_1$-C$_{18}$ alkyl, C$_1$-C$_{18}$alkoxy, C$_5$-C$_6$cycloalkyl or —CH$_2$—CH$_2$—CO—O—(C$_1$-C$_{18}$)alkyl;
R'$_2$ is a divalent or trivalent bridging group;
R$_4$ is a group

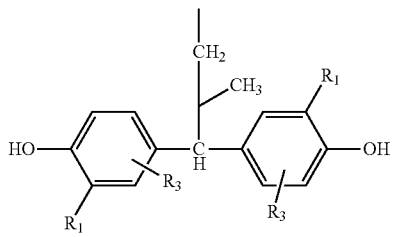

or hydrogen;
R$_2$ is hydrogen, methyl or a group

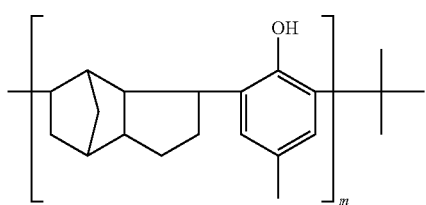

wherein m is a number from 1 to 10; and c) a thioether or thioether-ester with a melting point of more than 20° C. of formula (IIa), (IIb) or (IIc)

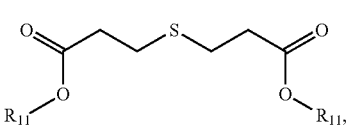
(IIa)

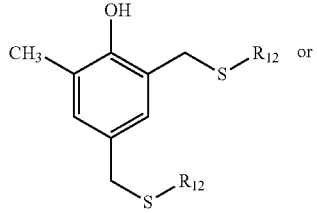
(IIb)

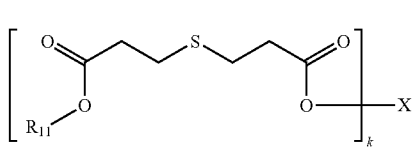
(IIc)

wherein
R$_{11}$ and R$_{12}$ are independently C$_1$-C$_{18}$alkyl
k is 2-4; and
X is 2-methyl-1,2,3-propane-triyl- or 1,2,3,4-methane-tetryl-.

The definitions, preferences and optional additives given above, apply also for the process of polymerization.

For example PVC can be produced from vinyl chloride monomer (VCM) by three different processes. The most widely used is the suspension type polymerization, which accounts for approximately 80-85%. Droplets of liquid vinyl chloride are dispersed in water using a protective colloid in a pressurized agitated reactor. Polymerization occurs inside the droplets as a result of the use of an oil-soluble initiator. The product is in the form of 100-150 μm diameter porous grains. Another process is the emulsion route, in which the monomer is dispersed in water, using agitation and powerful surfactants and the polymerization is carried out in the aqueous phase, using a water soluble initiator. The polymerization product is in the form of an aqueous latex dispersion of PVC particles 0.1-2.0 μm in diameter. These are spray-dried to form larger agglomerates, which are milled before being dispersed in solvents and plasticizers to give plastisols, used in a variety of spreading and dipping applications. The third route is bulk or mass polymerization. As the name implies the polymerization is carried out in vinyl chloride (VCM) in the absence of water. A review of the manufacturing of PVC is for example described in Encyclopedia of Polymer Science and Engineering, second edition, vol. 17, pages 295-376.

The components b) and c) can be added during the polymerization reaction or after the reaction is completed.

With regard to vinyl chloride polymerization, the overwhelming amount of polyvinyl chloride is prepared by suspension polymerization. In this process, the vinyl chloride monomer and an initiator are dispersed by agitation into a water phase at proper temperature and pressure. Suspending agents such as methyl or ethyl cellulose, gelatin, polyvinyl alcohol or other water-soluble polymers are utilized to stabilize the suspension during the polymerization reaction. Unreacted VCM is removed by a vacuum stripping process. The fine granules of polymer in the form of a slurry are discharged from the reactor and centrifuged or filtered to remove the water. Thorough washing and drying of the polymer to remove traces of the suspension stabilizer and the reaction medium conclude the procedure.

Toward the end of the polymerization cycle the pressure in the system begins to drop, followed very shortly by a peak in the polymerization rate. Beyond the peak, the rate begins to drop sharply and the polymer beads become less porous as the free monomer is absorbed into the polymer and polymerizes. Such change in the particle character, both in terms of porosity and particle size distribution, is disadvantageous to the manufacturer in terms of reduced performance and economy of production. Thus, the granulated porous structure is desired for enhanced plasticizer uptake to form dry blends for various extruding or calendaring operations. In order to avoid such adverse effects, the manufacturer will terminate the polymerization reaction prior to complete monomer conversion. The experience of the manufacturer will best determine the point at which polymerization is terminated to give high quality polymer, although 70 to 90% conversion reflects a general termination point.

Components b) and c) are preferably added at this stage of PVC manufacture.

Particularly preferred is a process wherein the polymerization is a suspension polymerization and the components b) and c) are added as an emulsion to the slurry towards the end of the polymerization reaction.

Yet a further aspect of the invention is the use of a sterically hindered phenolic antioxidant with a melting point of more than 20° C. together with a thioether or thioether-ester with a melting point of more than 20° C. according to claim 1 for the thermal stabilization of aqueous suspensions or emulsions of halogen containing polymers.

The following examples illustrate the invention.
General Polymerization Procedure:

A standard PVC polymerization reaction is carried out according to the suspension process in batch operation. A double jacketed pressure reactor of a volume of 5000 ml is operated at a temperature of 57° C., and a stirrer velocity of 1000 rpm. The pressure and the temperature in the reactor during the reaction are recorded.

The following recipe is added into the reactor:
1000 ml demineralized water, degassed
375 g vinyl chloride monomer
1500 mg polyvinyl alcohol, suspending agent
0.1 mol-% (based on vinyl chloride monomer) of initiator di-2-ethylhexylperoxodicarbonate, 75% in isodecane (Luperox 233M®, supplier: Atofina)
300 ppm (based on the weight of vinyl chloride monomer) of the additives given in table 1 are added at the beginning of the pressure drop (after approximately 3 h reaction time).

After a further reaction time of 1 hour, the reactor is degassed, and the polymer obtained is isolated by filtration. The obtained crude polymer is washed with water, filtered, washed with ethanol, and dried under vacuum at 40° C., until the weight remains constant. Yield: 88%.

Evaluation of the Thermal Stability of PVC Resin:

The heat stability of PVC resins is evaluated by measuring the dehydrochlorination reaction using a "763 PVC Thermomat®" (supplier Metrohm AG, CH 9101 Herisau, Switzerland). The amount of hydrochloric acid released from the PVC resin is a measure for its thermal instability. The amount of hydrochloric acid is quantified by dissolving it in water, and measuring the conductivity of the solution (see Table 1). The longer it takes to reach a certain level of conductivity, the more stable is the resin.

TABLE 1

| Example | additives | dosage form of additives | additive concentration (active) | PVC resin K-value | Thermal stability of PVC resin* |
|---|---|---|---|---|---|
| 1 comparative | Irganox 245 DW ® | suspension | 300 ppm | K-67 | 20 minutes |
| 2 comparative | Irganoxx 1141 EM ® | emulsion | 300 ppm | K-67 | 24 minutes |
| 3 inventive | Compound 1/ DLTDP 1:1 | emulsion | 300 ppm | K-67 | 29 minutes |

*Test: dehydrochlorination at 180° C., air (minutes to reach a conductivity of 60 microsiemens/cm)

Preparation of PVC Compounds and Evaluation of their Thermal Stability

The heat stability of PVC compounds is measured by preparing mill blends based on the following recipe:

PVC Resin (S-PVC K-60) 300 g

Commercial Processing Aid 9 g

Wax 2 g

Calcium Stearate 2 g

Methyl tin mercaptide stabilizer 1 g

The blend is placed on a heated 2 roll mill at about 195° C. for up to 15 minutes. Every 3 minutes material is removed from the mill and pressed into plaques. The color (Yellowness Index, YI according to DIN 6174) of the plaques is measured. The lower the YI, the better the thermal stability of the PVC compound (Table 2).

The results in Table 2 clearly indicate that the stabilization according to the instant invention also increases the stability during the compounding step.

TABLE 2

Thermal stability (color) of PVC compound

Yellowness Index after minutes on roll mill at 195° C.

| Stabilisers | 3 minutes | 6 minutes | 9 minutes | 12 minutes | 15 minutes |
|---|---|---|---|---|---|
| 300 ppm Irganox 245 ® | 2.4 | 5.8 | 9.4 | 13.9 | 21.6 |

TABLE 2-continued

Thermal stability (color) of PVC compound
Yellowness Index after minutes on roll mill at 195° C.

| Stabilisers | 3 minutes | 6 minutes | 9 minutes | 12 minutes | 15 minutes |
|---|---|---|---|---|---|
| 150 ppm compound 1 150 ppm DLTDP | −1.2 | 1.7 | 5.1 | 9.2 | 16.2 |

Irganox 245 ®

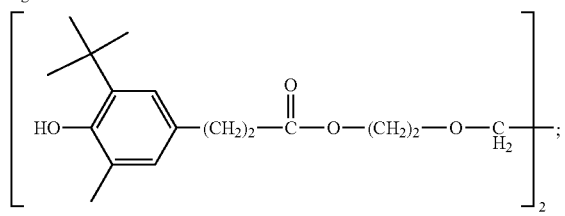

Compound 1

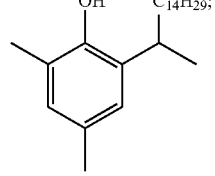

Irganox 1076 ®

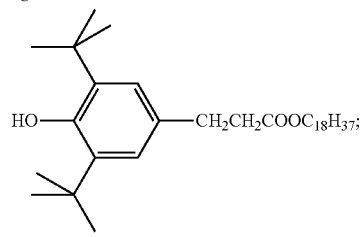

Irganox 1141 ® mixture of compound 1 and Irganox 1076, 4:1;
DLTDP is di-lauryl-thio-di-propionate
All compounds are supplied by Ciba Specialty Chemicals.

The invention claimed is:

1. A composition comprising
   a) a halogen containing polymer consisting of poly(vinyl chloride) homopolymer in the form of an aqueous suspension or emulsion,
   b) a sterically hindered phenolic antioxidant with a melting point of more than 20° C. which is

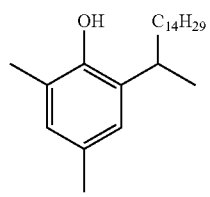

and c) a thioether or thioether-ester with a melting point of more than 20° C., which is di-lauryl-thio-di-propionate.

2. A composition according to claim 1 wherein the sterically hindered phenolic antioxidant, component b) is present in an amount from 50 ppm to 2000 ppm by weight based on the weight of vinyl chloride monomer.

3. A composition according to claim 1 wherein component c) is present in an amount from 50 ppm to 2000 ppm by weight based on the weight of vinyl chloride monomer.

4. A composition according to claim 2 wherein the weight ratio of component b) to component c) is from 1:10 to 10:1.

5. A composition according to claim 1, which additionally contains a sterically hindered phenolic antioxidant different from that of component b), a phosphorous containing stabilizer, a 2-benzofuranone stabilizer, a sterically hindered amine light stabilizer or a UV-absorber.

6. A process for the stabilization of a halogen containing polymer against thermal degradation, which process comprises adding to a) a halogen containing polymer consisting of poly(vinylchloride) homopolymer, which is in an aqueous suspension or emulsion,
   b) a sterically hindered phenol antioxidant with a melting point of more than 20° C. which is

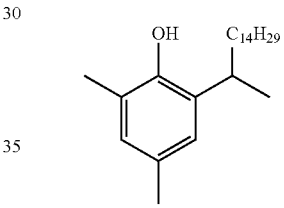

and c) a thioether or thioether-ester with a melting point of more than 20° C., which is di-lauryl-thio-di-propionate, during or towards the end of a polymerization process.

7. A process according to claim 6 wherein the components b) and c) are added towards the end of the polymerization reaction.

8. A process according to claim 6 wherein the polymerization is a suspension polymerization and the components a) and b) are added as an emulsion towards the end of the polymerization reaction.

* * * * *